United States Patent [19]

Peterson et al.

[11] Patent Number: 4,767,513

[45] Date of Patent: Aug. 30, 1988

[54] ZIRCONIUM ISOTOPE SEPARATION PROCESS

[75] Inventors: Steven H. Peterson, Murrysville; Edward J. Lahoda, Edgewood Borough, both of Pa.

[73] Assignee: Westinghouse Electric Corp., Pittsburgh, Pa.

[21] Appl. No.: 24,208

[22] Filed: Mar. 10, 1987

[51] Int. Cl.[4] .................. B01D 59/34; B01D 11/00; C01G 25/00

[52] U.S. Cl. .................. 204/157.21; 204/157.2; 204/157.22; 423/70

[58] Field of Search ........... 204/157.2, 157.21, 157.22; 423/2, 70

[56] References Cited

U.S. PATENT DOCUMENTS

| | | | |
|---|---|---|---|
| 3,069,232 | 12/1962 | Greenberg et al. | 423/70 |
| 4,389,292 | 6/1983 | Phillips et al. | 204/157.2 |
| 4,578,165 | 3/1986 | Peterson et al. | 204/157 |
| 4,584,183 | 4/1986 | Chiang et al. | 423/2 |
| 4,612,097 | 9/1986 | Jackovitz et al. | 204/157.2 |

FOREIGN PATENT DOCUMENTS 2104797 3/1983 United Kingdom.

OTHER PUBLICATIONS

K. Kogure et al., *Journal of Chromatography*, 259(1983), pp. 480-486.

Primary Examiner—John F. Terapane
Assistant Examiner—Virginia B. Caress

[57] ABSTRACT

The zirconium 91 isotope is separated from zirconium by a photo-assisted extraction process wherein a first solution is formed of a first solvent, scavenger and zirconium compound, which compound reacts with the scavenger when exposed to light, and while irradiating the first solution to form a zirconium reaction product, contacting the same with a second solvent that is immiscible with the first solvent and is a preferential solvent for the zirconium reaction product, with the reaction product transferred to the second solution, and the two solutions then separated. An acidic aqueous media is preferred as the first solvent, with excess acid used to provide anions that act as the scavenger.

12 Claims, 4 Drawing Sheets

Samples Taken at F, C2R, B3R, C2E, C1E (R = Heads, E = Tails)

ZIRCONIUM ISOTOPE SEPARATION PROCESS

The present process is a process for separation of the zirconium 91 isotope from other isotopes in zirconium and uses a photo-assisted solvent extraction system.

It has been disclosed, for example, in U.S. Pat. No. 4,389,292 and U.S. Pat. No. 4,612,097, both of which are assigned to the assignee of the present invention, to separate isotopes of zirconium by a photochemical method based upon electronic excitation of zirconium complexes. The isotope effect arises from the interaction of nuclear magnetic moment with the excited electronic state. For zirconium, only the isotope with mass 91 has a nonzero nuclear magnetic moment, so the molecules in a supply of zirconium may be separated into two portions by photochemical excitation. The two portions differ by the lifetime of the excited state, so that the portion containing $^{91}Zr$ has a longer excited state lifetime than the portion containing the other isotopes of zirconium (having masses of 90, 92, 94 and 96 amu).

In U.S. Pat. No. 4,389,292, which is incorporated by reference herein, a chemical isotope separation process involves initially forming a zirconium complex or chelate and exposing the same to selected wavelength photons such that the metal ligand bond may rupture and then reform. The photon excited states of the metal-ligand bond for even and odd zirconium isotopes are a singlet and triplet which drop back to the ground state at slightly different rates. If a scavenger, or second chelate or complexing liquid, is available to react with the excited metal-ligand molecule, then the product of this reaction would become enriched with the $^{91}Zr$ isotope since the triplet state is expected to remain in the excited state for a longer time.

In U.S. Pat. No. 4,612,097, which is incorporated by reference herein, the zirconium 91 isotope content of zirconium is reduced by forming a solution of a zirconium compound and a scavenger of 8-hydroxyquinoline or its derivatives, and irradiating the solution with light at wavelength that excites the zirconium compound such that it reacts with the scavenger. Since the zirconium 91 isotope remains excited longer, the same reacts disproportionately with the scavenger. The reaction product is precipitated from the solution and is enriched in the $^{91}Zr$ isotope.

In order to achieve a significant isotope separation, the two above-described photochemical processes preferably use a zirconium complex such as zirconium tetraacetylacetonate [Zr(AcAc)$_4$], which is soluble in a variety of solvents, including acidic water, methanol or cyclohexanol, with a scavenger, or molecular, present which will react with the electronically excited zirconium complex. As described above, since the zirconium complexes containing the mass 91 isotope have a longer excited state lifetime, the probability of reaction is higher for such excited species than is the probability of reaction for the zirconium complexes containing the other isotopes. In these previous systems, the photochemical product was a precipitate. A minimum degree of enrichment of the precipitate resulted in a precipitate with about 11.45 percent $^{91}Zr$ and the remaining solution contained a fraction of zirconium with about 11.05 percent $^{91}Zr$, compared to the natural abundance of about 11.23 percent of that isotope in zirconium. The parameter used to characterize such a separation is the heads to tails separation factor, $$\alpha = \frac{X_h/(1-X_h)}{X_t/(1-X_t)} \quad (1)$$

where $X_h$ is the mole fraction of a given isotope in the heads fraction and $X_t$ is the mole fraction of the same isotope in the tails fraction.

An overall separation that reduces the $^{91}Zr$ isotope content of zirconium to less than one percent is desired. The necessary alpha depends on the cut, or fraction of feed resulting in the desired product. For a cut of one-third, an overall alpha of 18.5 is required. The dependence of alpha on cut, for production of zirconium with less than one percent $^{91}Zr$, is shown in FIG. 1. It is clear that an overall alpha of 15 to 20 will be required in order to obtain the necessary isotope separation with a reasonable cut. Since the observed photochemical separation factor for the precipitation process is only 1.05, it is necessary to find a way to increase the same.

Solvent extraction is a common industrial process with applications for separation of similar chemical species, and with known application to isotope separation. For example, uranium isotopes can be separated by solvent extraction, as described by S. Villani in *Isotope Separation*, American Nuclear Society, 1976, P. 53, but the single stage separation factor is $\alpha = 1.0016$. No economic solvent extraction process for uranium enrichment has been developed. Also, as described in U.S. Pat. No. 4,584,183, assigned to the assignee of the present invention, and which is incorporated by reference herein, a solvent extraction-exchange process is usable to separate a feed stream of an aqueous solution of a mixture of $^{90}Zr$ salts into two aqueous product streams, each containing both a $^{90}Zr$ isotopic portion and a $^{91}$ to $^{96}Zr$ isotopic portion, but in different ratios. The zirconium salts usable are thiocyanate, nitrate, sulfate, chloride, and perchlorate salts and mixtures thereof.

SUMMARY OF THE INVENTION

A process for separating the zirconium 91 isotope in zirconium is provided wherein a first solution of solvent, scavenger and zirconium compound, which compound reacts with the scavenger when exposed to light, is formed and irradiated to photoreact a disproportionate amount of the zirconium compound containing the 91 isotope with the scavenger to form a reaction product. At the same time, the irradiated first solution is contacted with a second solvent that is immiscible with the first solvent and is a preferential solvent for the zirconium reaction product, with reaction product thus transferred to the second solvent to form a second solution, and the two solutions are then separated.

The first solvent is preferably an acidic aqueous media, and the second solvent an immiscible organic solvent such as benzene or kerosene containing an extractant medium. The scavenger may be an additional chemical compound in the aqueous acidic media or an excess of acid may be used to provide anions which act as scavengers.

DETAILED DESCRIPTION

Figure 1:
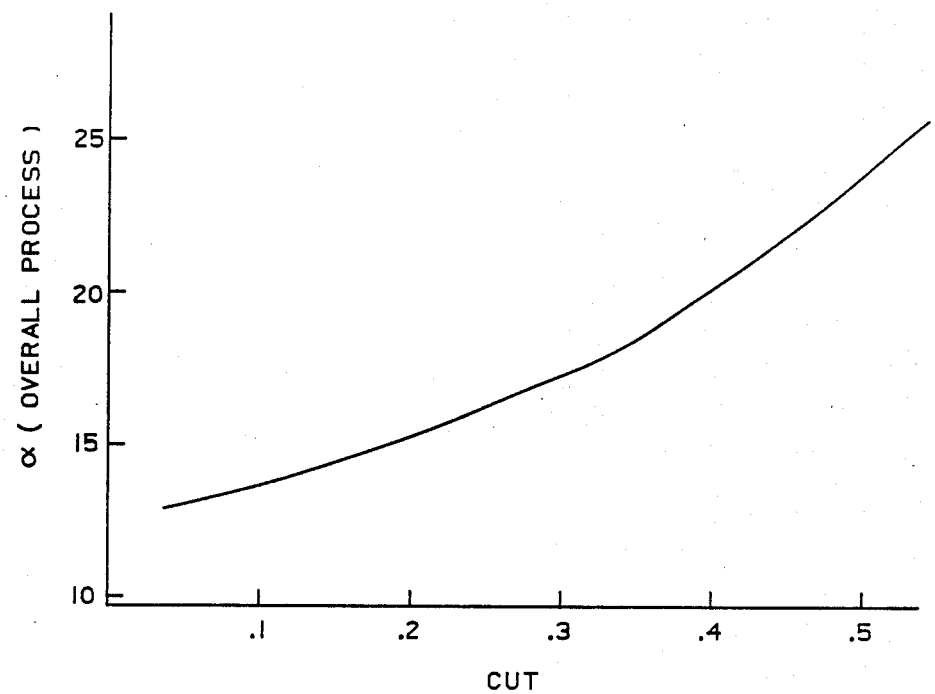
FIG. 1 is a graphic illustration between cut (heads/feed) and overall process $\alpha$ for production of zirconium with $^{91}Zr$ of less than 1 percent for a photochemical process that specifically removes $^{91}Zr$.

In the present solvent extraction-photochemical zirconium isotope separation process, distribution of zirconium between the two phases, or solvent streams, is accomplished by having the zirconium present as two distinct chemical species, one of which is preferentially soluble in a first solvent (e.g. acidic water) and the other of which is preferentially soluble in the immiscible second solvent (e.g. xylene). The two zirconium species are in thermodynamic equilibrium governed by the zirconium distribution coefficient:

$$K = \frac{[ZrX]}{[ZrY]}$$

where for the sake of the argument ZrX is the preferentially aqueous phase soluble species and ZrY is the species preferentially dissolved in the organic solvent. The brackets indicate concentration.

In order for solvent extraction isotope separation to occur, it is necessary for K in Eq. 2 to vary slightly depending on which isotope of zirconium is involved, and for kinetic exchange of Zr between phases to proceed at a viable rate. In principle, the faster the exchange rate, the better.

The exchange reaction can be written as follows:

$$ZrX + Y \rightleftharpoons ZrY + X \qquad (3)$$

The effect of photochemistry is that one of the zirconium species, for instance ZrX, absorbs light of a selected wavelength with the result tht the rate of reaction is increased for conversion of ZrX to ZrY, and furthermore that the increase is greater if a $^{91}Zr$ atom is involved. The overall equilibrium still applies, so the back conversion of ZrY to ZrX also is speeded up, but this process is not isotope selective. The effect is to deplete the ZrX phase in $^{91}Zr$ and to enrich the ZrY phase in $^{91}Zr$. The efficiency of this enrichment step should be the same as was observed in the previously described precipitation process of U.S. Pat. No. 4,612,097.

Under steady illumination conditions, the isotope ratio in the excited state can be calculated. Zr is considered to consist of two fractions, $X_o$ being the fraction of $^{91}Zr$ in the ground state, and $(1-X_o)$ the fraction of the other isotopes in the ground state. When a sample of mixed Zr isotopes is excited, the $^{91}Zr$ relaxes to the ground state with a characteristic lifetime $t_o$, and the other isotopes relax with lifetime $t_e$. The ratio $k = t_o/t_e$ only needs to be different from 1 to produce an isotope effect. If light is being absorbed at a rate $I_o$, then $^{91}Zr$ excited states are being created at the rate $X_o I_o$ and excited states of the other isotopes are being created at the rate $(1-X_o)I_o$. The excited state populations obey the equations:

$$\frac{dN_o}{dt} = X_o I_o - \frac{N_o}{T_o} \qquad (4)$$

$$\frac{dN_e}{dt} = (1-X_o)\tau_o - \frac{N_e}{T_e} \qquad (5)$$

At steady state, the rate of change is zero, so $$N_o = X_o I_o k T_e \qquad (6)$$

$$N_e = (1-X_o)I_o T_e \qquad (7)$$

The fraction of $^{91}Zr$ in the excited state, then, is given by $$\frac{N_o}{N_o + N_e} = \frac{kX_o}{kX_o - X_o + 1} \qquad (8)$$

Notice that the excited state isotope ratio depends only on the ground state ratio and the ratio, k, of excited state lifetimes. Furthermore, when k is small and the isotope composition is typical of $^{91}Zr(X_o \sim 0.1)$, the excited state isotope ratio depends almost linearly on k.

Figure 2:
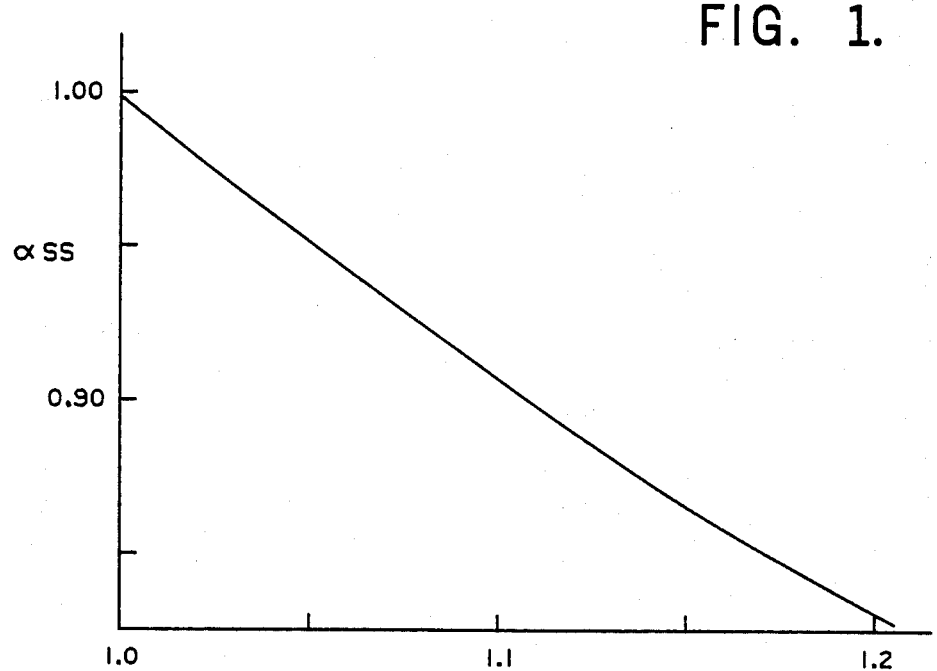
FIG. 2 graphically illustrates a maximum single state separation factor ($\alpha_{ss}$) calculated for photochemical zirconium isotope separation, as a function of excited state lifetime ratio. $\alpha_{ss}$ is less than 1 because $^{91}Zr$ is being depleted.

It is possible to calculate the single-stage enrichment produced by photochemial excitation of Zr complexes. The process was modeled by computer in the following manner. Starting with the natural composition, the excited state isotope mixture was calculated, and it was assumed that 10% of the total Zr reacted under those conditions. The result is a shift in the isotope ratio and of the total concentration of Zr in each solvent. Overall equilibrium (Eq. 2) was then restored by shift of 10% of the Zr back into the first solvent. The process was repeated iteratively until no further change resulted. $\alpha_{SS}$ was then calculated from the isotope composition of each solvent phase. The single stage enrichment factor thus calculated is independent of the distribution constant, and nearly linearly dependent on the lifetime ratio, k. Results are given in FIG. 2.

In solvent extraction mode the two Zr complexes are being carried along with the counter current flowing solvents. The photochemical exchange process is continually shifting Zr from one solvent to the other. The overall equilibrium is also being maintained. The result is continuous enrichment, similar to normal solvent extraction. However, coupling the photochemical process to counter-current solvent extraction gives a single-stage separation factor that is determined by the optical properties of the system. The result can be a photochemical separation factor that is much larger than the normal solvent extraction separation factor, resulting in a much smaller system. If the number of stages is cut by a factor of 10, in general the corresponding inventories of solvents and reagents will also be cut by a factor of 10.

Solvent extraction separation, in general, is based on distribution of a chemical system between two immiscible solvents, so a distribution constant of the type $$K = \frac{[A]}{[B]}$$

applies. As a sample moves through a solvent extraction column, the components repeatedly exchange between the counterflowing solvents, and enrichment or depletion in a particular stream occurs on the basis of different values of K. Thus, for isotope separation by solvent extraction it is necesary to find solvents and extractants that give isotope dependent K values.

The single-stage separation factor is the key parameter for design of a multi-stage solvent extraction column. For the present process, such a column would have a number of theoretical stages sufficient to give the desired final product composition. This number of stages is determined by the cut, which defines the tails composition, and the Fenske equation which relates the number of stages to the overall process alpha, $\alpha$, and the single stage alpha, $\alpha_s$:

$$N + 1 = \log \alpha / \log \alpha_s \quad (10)$$

If the cut is designated as $$Z = H/F \quad (11)$$

then the tails composition can be calculated from the feed composition, the desired heads composition and the cut:

$$H(I) = zX_H(I) \quad (12)$$

$$T(I) = F(I) - H(I) \quad (13)$$

$$X_T(I) = \frac{T(I)}{\epsilon T(I)} \quad (14)$$

where again the summation is over all the isotopes in the tail.

Figure 3:
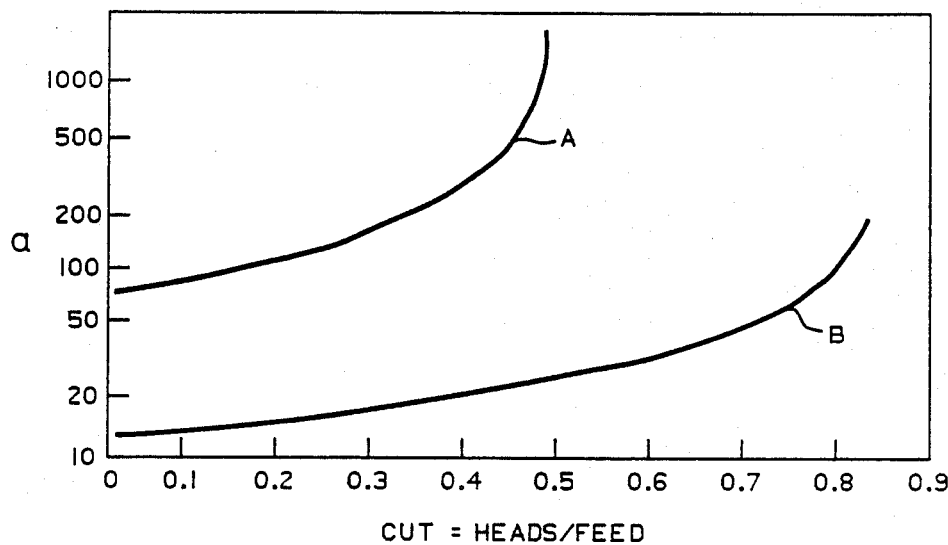
FIG. 3 is a graphical illustration of a calculated overall alpha required for production of zirconium with less than 1 percent of $^{91}Zr$ for a solvent extraction process (A) and the present photo-assisted solvent extraction process (B) as a function of cut.

$\alpha$ is now calculated as a function of cut, using Equation 9 with the overall heads and tails compositions calculated from Eqs. 12–14. The number of theoretical stages required to achieve the required separation, as a function of z and $\alpha_s$ is shown in FIG. 3, for solvent extraction (A) and for the present process (B).

In solvent extraction isotope separation, the isotope effect on the distribution ratio is found to be proportional to the mass difference between isotopes, and usually depends on the ratio $\Delta M/M$ where $\Delta M$ is the difference between the isotope masses and M is the average mass. For solvent extraction separation of Zr, it is necessary to concentrate on the separation of $^{90}$Zr from $^{91}$Zr. The other (heavier) isotopes would be expected to separate more efficiently from $^{90}$Zr because of their larger M values. Thus, a solvent extraction process to produce Zr with <1% $^{91}$Zr must enrich $^{90}$Zr to approximately 99% purity. Pure solvent extraction has a limit on cut of z=0.5 and will produce a waste stream enriched in all the other isotopes. A large number of theoretical stages are required because the required overall separation factor is large and the stage separation factor is small.

Photochemical enhancement of solvent extraction according to the present process will improve the separation of $^{90}$Zr from $^{91}$Zr by introducing an effect that specifically removes the one undesirable isotope. The present process will produce product that has $^{90}$Zr enriched by solvent extraction to an overall degree determined by $\alpha_s$, Z and the number of stages, $N_s$. Because of the photochemical effect, depleting $^{91}$Zr to 1% requires fewer stages than a straight solvent extraction process to achieve the same $^{90}$Zr/$^{91}$Zr ratio. As a result, some of the heavier isotopes will be left in the product and a larger cut is possible. Because the product can contain all the even-mass isotopes, maximum theoretical cut is increased to 90% and fewer theoretical stages are required. These benefits do, however, require capital investment and operating expense for lamps and electrical power. Straight solvent extraction will produce a product with a neutron capture cross section of 38 mbarn, compared to the natural value of 97 mbarn. The present process produces a product that contains all even-mass isotopes and a slightly larger cross section of 50 mbarn will result. The following table lists the predicted properties of a "pure solvent extraction" product and of a "pure photochemical" product, although it must be remembered that the present process will combine some solvent extraction-type enrichment of $_{90}$Zr relative to the other even-mass isotopes, so the present product will be intermediate in properties between the two limiting cases:

| COMPARISON OF CALCULATED PRODUCT COMPOSITION AND ENRICHMENT FACTORS FOR PHOTOCHEMICAL PROCESS (ASSUMING NO SOLVENT EXCHANGE CONTRIBUTION) AND FOR SOLVENT EXCHANGE | | | | | |
|---|---|---|---|---|---|
| ISOTOPE | $^{90}Zr$ | $^{91}Zr$ | $^{92}Zr$ | $^{94}Zr$ | $^{96}Zr$ |
| Natural | 0.5145 | 0.1132 | 0.1789 | 0.1728 | 0.0278 |
| PHOTOCHEMICAL RESULT, CUT = 0.8 | | | | | |
| $X_H$ | 0.5698 | 0.0099 | 0.1981 | 0.1914 | 0.0308 |
| $X_T$ | 0.3612 | 0.3723 | 0.1256 | 0.1213 | 0.0195 |
|  | 2.3420 | 0.0169 | 1.7200 | 1.7140 | 1.5957 |
| 1/ | 0.4270 | 59.3110 | 0.5814 | 0.5834 | 0.6267 |
| SOLVENT EXTRACTION RESULT, CUT = 0.3 | | | | | |
| $X_H$ | 0.9887 | 0.0099 | 0.0010 | 0.0003 | 0.0001 |
| $X_T$ | 0.3077 | 0.1560 | 0.2527 | 0.2444 | 0.0393 |
|  | 197.3439 | 0.0540 | 0.0029 | 0.0009 | 0.0024 |
| 1/ | 0.0051 | 18.5027 | 341.6445 | 1089.8515 | 413.5830 |

It is also worthy of note that the amount of waste Zr produced by the two processes is quite different. The production of 954,000 lbs/yr of enriched Zr by a solvent extraction process, at a cut of 0.3, will leave 2.2 million pounds of Zr waste with a neutron capture cross section of 127 mbarn. Production of the same amount of Zr product by the present process, operating at a cut of 0.8, will give only 0.24 million pounds of waste Zr, with a net neutron capture cross section of 228 mbarn.

The two solvents used in the present photo-assisted solvent extraction process must be immiscible to enable ready separation thereof. The first solution will generally use acidic water as a solvent and will contain the zirconium compound being treated and a scavenger for the zirconium compound when exposed to light of the designated wavelength. The water should be acidified in order to serve as a solvent for the zirconium compound and the scavenger and is a 0.5 to 8.0 molar acidic aqueous solution. Acids that are suitable in forming the 0.5 to 8.0 molar solution are preferably hydrochloric, nitric and sulfuric acids.

The acidic solution contains a zirconium compound that is soluble therein and which is excitable by the light of the designated range. Examples of such zirconium compounds are zirconium sulfate, $Zr(SO_4)_2$; zirconyl chloride, $ZrOCL_2$; zirconium perchlorate, $Zr(ClO_4)_2$, and zirconium tetrachloride, $ZrCl_4$; as well as zirconium oxide, $ZrO_2$, which will form a salt and dissolve in an acidic aqueous solution, for example forming zirconyl chloride ($ZrOCl_2$) upon dissolving in an aqueous hydrochloric acid medium.

Scavengers that may be added to the first solvent, in formation of the first solution, may be the complexing agents such as citric acid, tartaric acid and beta diketones, such as acetylacetone, dibenzoylmethane, benzoylacetone, trifluoroacetylacetone and other beta diketones. 8-hydroxy quinoline ("oxine") and its derivatives such as chloro, bromo, fluoro and hydroxy derivatives are also useful, as described in U.S. Pat. No. 4,612,097. Or, an excess of the ions from the acid in the aqueous solution, such as chloride ions, or other ions, may serve as a scavenger. By adjustment of the pH of the aqueous solution to a value where the ratio of such ion to zirconium present in the first solution is greater than 1:1, the excess anions resulting can serve as a scavenger.

Figure 4:
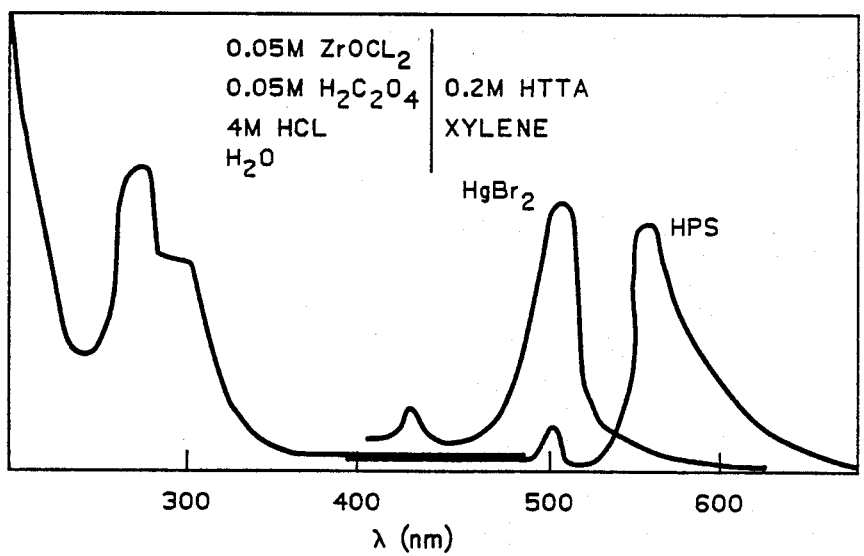
FIG. 4 is an illustration of absorption spectrum of a zirconium reaction system, and emission spectrum of high pressure sodium vapor lamp (HPS) used for isotope enrichment, illustrating that a mercury bromide lamp ($HgBr_2$) would be a better match to the absorption spectrum.

The first solution, containing the zirconium compound in a first solvent and a scavenger therefor is irradiated with light at a wavelength of between about 220–600 nm. Experiments have been made to demonstrate that photochemical systems could produce isotope separation using conventional light sources. A sodium vapor lamp was used for this purpose (exposure to sunlight has also been shown to cause similar Zr isotope separations). FIG. 4 shows the emission spectrum of a sodium vapor lamp (left side of figure), as well as that for a mercury halide lamp ($HgBr_2$). Isotope separation was observed with the sodium vapor lamp even though the lamp spectrum barely overlaps the absorption spectrum of the Zr complexes. Better separation should result from the use of a mercury halide lamp since its spectrum would give a better match to the Zr absorption.

While beinbg irradiated with the light of the required wavelength, the first solution is contacted with a second solvent that is immiscible with the first solvent, and which is a preferential solvent for the reaction product formed in the first solution by the irradiation. The second solvent is preferably selected from benzene, toluene, xylene, a kerosene, or other water immiscible organic solvent. The solvent preferably contains an extractant medium for the zirconium reaction product formed in the first solution, such as benzyoylactone (BzAc), 2-thenoyltrifluoracetone (HTTA), dibenzoylmethane (DBM), a primary amine such as that sold under the tradename PRIMENE JMT sold by Rohm & Haas, a phosphoric acid such as bis(2, 4, 4')trimethylpentyl phosphoric acid sold under the tradename Cyanex 272 sold by American Cyanamid, or quaternary ammonium salts such as tricaprylyl methyl ammonium chloride (Aliquat 336). Such extractant mediums are liquid ion exchange compounds which will preferentially effect the extraction of the zirconium reaction product from the aqueous feed stream. The extractant medium should be present in the organic solvent as a solution of about a 0.05 to 1.0 molar solution.

EXAMPLE I

As an example of the present process, the aqueous solutions of zirconium compound listed on Table I were irradiated as indicated and contacted with the organic phase indicated, using Aliquat 336 as an extractant medium. The results were:

Table I

TABLE I

| Sample | Organic Phase | Aqueous Phase | Optical System | Exp. | 91/90 Ratio | $\alpha s \left( \dfrac{EF}{\dfrac{91}{90}} \right)$ | K |
|---|---|---|---|---|---|---|---|
|   | 0.1 M Aliquat 336 | 0.05 M $ZrOCl_2$ | a | L | f = 0.21863 | 0.9977 | 0.49 |
| 1 | Xylene | 8 M HCl |   |   | h = 0.21858 |   |   |
| 2 |   |   |   |   | t = 0.21909 |   |   |
| 3 | 0.1 M Aliquat 336 | 0.05 M $ZrOCl_2$ | a | c | h = 0.21852 | 0.9966 | 0.56 |
| 4 | Xylene | 8 M HCl |   |   | t = 0.21926 |   |   |
|   |   |   | SV | L | f = 0.21859 |   |   |
| 5 | 0.1 M Aliquat 336 | 0.05 M $ZrOCl_2$ |   |   | h = 0.21823 | 0.9930 | 0.52 |
| 6 | Xylene | 8 M HCl |   |   | t = 0.21977 |   |   |
|   |   |   | SV | c | f = 0.21859 |   |   |
| 7 | 0.1 M Aliquat 336 | 0.05 M $ZrOCl_2$ |   |   | h = 0.21856 | 0.9962 | 0.54 |
| 8 | Xylene | 8 M HCl |   |   | t = 0.21940 |   |   | a = 200 W tungsten Filament Lamp
c = 2 hours
L = 1 hour
SV = Sodium Vapor 300 mW 300–400 nm
Exp. = Exposure
K = Distribution K = Org/Aq
EF = Enrichment Factor

EXAMPLE II

As a further example of the present process, a series of runs were made where a $Zr(SO_4)_2$ solution (0.05M) in 0.5M $H_2SO_4$, which was deoxygenated, was irradiated with an argon ion laser (0.5 W at 363 nm) and contacted with a second solvent (xylene containing 0.1M benzoylacetone) for the times listed in Table II-A and with the results listed therein:

Table II-A

A second set of runs using the same feed solution composition and other parameters gave the following results:

Table II-B

TABLE II

| Run No. | Exposure | M(i) | Aqueous Weight Fraction | Organic Weight Fraction | α s | Distribution K = Org/Aq | Photon Dose |
|---|---|---|---|---|---|---|---|
| | (Aqueous Feed) | 90 | 0.5054 | | | | |
| | | 91 | 0.1116 | | | | |
| | | 92 | 0.1731 | | | | |
| | | 94 | 0.1800 | | | | |
| | | 96 | 0.0297 | | | | |
| 9 | 5 min. | 90 | 0.5054 | 0.5055 | 1.000 | 0.03 | 0.50 |
| | | 91 | 0.1116 | 0.1116 | 1.000 | | |
| | | 92 | 0.1731 | 0.1731 | 1.000 | | |
| | | 94 | 0.1800 | 0.1800 | 1.000 | | |
| | | 96 | 0.0297 | 0.0297 | 1.000 | | |
| 10 | 10 min. | 90 | 0.5063 | 0.5055 | 1.003 | 0.10 | 1.00 |
| | | 91 | 0.1118 | 0.1116 | 1.002 | | |
| | | 92 | 0.1729 | 0.1731 | 0.998 | | |
| | | 94 | 0.1794 | 0.1800 | 0.996 | | |
| | | 96 | 0.0296 | 0.0297 | 0.996 | | |
| 11 | 30 min. | 90 | 0.5060 | 0.5055 | 1.002 | 0.12 | 3.00 |
| | | 91 | 0.1118 | 0.1116 | 1.002 | | |
| | | 92 | 0.1730 | 0.1731 | 0.999 | | |
| | | 94 | 0.1795 | 0.1800 | 0.996 | | |
| | | 96 | 0.0296 | 0.0297 | 0.996 | | |
| 12 | 1 hour | 90 | 0.5056 | 0.5055 | 1.000 | 0.14 | 6.00 |
| | | 91 | 0.1120 | 0.1116 | 1.004 | | |
| | | 92 | 0.1728 | 0.1731 | 0.998 | | |
| | | 94 | 0.1804 | 0.1800 | 1.002 | | |
| | | 96 | 0.0295 | 0.0297 | 0.993 | | |
| 13 | 2 hours | 90 | 0.5068 | 0.5055 | 1.005 | 0.14 | 12.0 |
| | | 91 | 0.1122 | 0.1116 | 1.006 | | |
| | | 92 | 0.1727 | 0.1731 | 0.997 | | |
| | | 94 | 0.1789 | 0.1800 | 0.992 | | |
| | | 96 | 0.0294 | 0.0297 | 0.989 | | |
| Sample | | | | | | | |
| 14 | 5 min | 90 | 0.5068 | 0.5055 | 1.005 | 0.15 | 0.5 |
| | | 91 | 0.1120 | 0.1116 | 1.004 | | |
| | | 92 | 0.1727 | 0.1731 | 0.997 | | |
| | | 94 | 0.1790 | 0.1800 | 0.989 | | |
| | | 96 | 0.0294 | 0.0297 | 0.989 | | |
| 15 | 1 hour | 90 | 0.5066 | 0.5066 | 1.004 | 0.16 | 6.0 |
| | | 91 | 0.1121 | 0.1116 | 1.005 | | |
| | | 92 | 0.1730 | 0.1731 | 0.999 | | |
| | | 94 | 0.1800 | 0.1800 | 1.000 | | |
| | | 96 | 0.0286 | 0.0297 | 0.961 | | |
| 16 | 2 hours | 90 | 0.5072 | 0.5055 | 1.007 | 0.16 | 12.0 |
| | | 91 | 0.1122 | 0.1116 | 1.006 | | |
| | | 92 | 0.1721 | 0.1731 | 0.993 | | |
| | | 94 | 0.1789 | 0.1800 | 0.992 | | |
| | | 96 | 0.0294 | 0.0297 | 0.989 | | |

EXAMPLE III

A series of runs were made as in Example I, except that 0.0015M Triton was added to the aqueous solution, the results being:

Table III

TABLE III

| Sample | Exposure | M(i) | Aqueous Weight Fraction | Organic Weight Fraction | α s | Distribution K = Org/Aq | Photon Dose |
|---|---|---|---|---|---|---|---|
| 17 | 5 min | 90 | 0.5054 | 0.5055 | 1.000 | 0.02 | 0.5 |
| | | 91 | 0.1117 | 0.1116 | 1.001 | | |
| | | 92 | 0.1731 | 0.1731 | 1.000 | | |
| | | 94 | 0.1800 | 0.1800 | 1.000 | | |
| | | 96 | 0.0297 | 0.0297 | 1.000 | | |
| 18 | 10 min | 90 | 0.5063 | 0.5055 | 1.003 | 0.12 | 1.0 |
| | | 91 | 0.1118 | 0.1116 | 1.002 | | |
| | | 92 | 0.1729 | 0.1731 | 0.998 | | |
| | | 94 | 0.1794 | 0.1800 | 0.996 | | |
| | | 96 | 0.0296 | 0.0297 | 0.996 | | |
| 19 | 30 min | 90 | 0.5063 | 0.5055 | 1.003 | 0.16 | 3.0 |
| | | 91 | 0.1118 | 0.1116 | 1.002 | | |
| | | 92 | 0.1730 | 0.1731 | 0.999 | | |
| | | 94 | 0.1795 | 0.1800 | 0.996 | | |
| | | 96 | 0.0296 | 0.0297 | 0.996 | | |
| 20 | 1 hour | 90 | 0.5069 | 0.5055 | 1.006 | 0.19 | 6.0 |
| | | 91 | 0.1122 | 0.1116 | 1.006 | | |
| | | 92 | 0.1728 | 0.1731 | 0.998 | | |
| | | 94 | 0.1793 | 0.1801 | 0.995 | | |

TABLE III-continued

| | | | | | | | |
|---|---|---|---|---|---|---|---|
| | | 96 | 0.0294 | 0.0297 | 0.989 | | |
| 21 | 2 hours | 90 | 0.5072 | 0.5055 | 1.007 | 0.19 | 12.0 |
| | | 91 | 0.1124 | 0.1116 | 1.008 | | |
| | | 92 | 0.1724 | 0.1731 | 0.995 | | |
| | | 94 | 0.1787 | 0.1801 | 0.991 | | |
| | | 96 | 0.0294 | 0.0297 | 0.989 | | |
| 22 | 5 min | 90 | 0.5049 | 0.5055 | 0.998 | 0.25 | 1.8 |
| | | 91 | 0.1116 | 0.1116 | 1.000 | | |
| | | 92 | 0.1731 | 0.1731 | 1.000 | | |
| | | 94 | 0.1806 | 0.1801 | 1.004 | | |
| | | 96 | 0.0298 | 0.0297 | 1.003 | | |
| 23 | 10 min | 90 | 0.5049 | 0.5055 | 0.998 | 0.15 | 3.6 |
| | | 91 | 0.1116 | 0.1116 | 1.000 | | |
| | | 92 | 0.1732 | 0.1731 | 1.000 | | |
| | | 94 | 0.1806 | 0.1800 | 1.004 | | |
| | | 96 | 0.0298 | 0.0297 | 1.003 | | |
| 24 | 30 min | 90 | 0.5049 | 0.5055 | 0.998 | 0.20 | 11.0 |
| | | 91 | 0.1115 | 0.1116 | 0.999 | | |
| | | 92 | 0.1731 | 0.1731 | 1.000 | | |
| | | 94 | 0.1806 | 0.1800 | 1.004 | | |
| | | 96 | 0.0298 | 0.0297 | 1.003 | | |
| 25 | 1 hour | 90 | 0.5045 | 0.5055 | 0.996 | 0.27 | 20.0 |
| | | 91 | 0.1124 | 0.1116 | 1.008 | | |
| | | 92 | 0.1727 | 0.1731 | 0.997 | | |
| | | 94 | 0.1802 | 0.1801 | 1.001 | | |
| | | 96 | 0.0295 | 0.0297 | 0.993 | | |
| 26 | 2 hours | 90 | 0.5041 | 0.5055 | 0.995 | 0.30 | 40.0 |
| | | 91 | 0.1126 | 0.1116 | 1.010 | | |
| | | 92 | 0.1729 | 0.1731 | 0.998 | | |
| | | 94 | 0.1803 | 0.1801 | 1.002 | | |
| | | 96 | 0.0294 | 0.0297 | 0.989 | | |

Samples 22 to 26 have organic phases, aqueous phases and optical systems as follows:

| Organic Phase | Aqueous Phase | Optical System |
|---|---|---|
| 0.10 M BzAc | 0.05 M $Zr(SO_4)_2$ | Ar ion laser |
| Xylene | 0.05 M $H_2SO_4$ | 335 nm |
| | 0.0015 M Triton | 351 nm |
| | | 363 nm |
| | | 1.8 W |

EXAMPLE IV

A series of runs were made using the aqueous solutions, organic phases (second solvents), optical systems and times of exposure listed in Table IV, using thenoyltrifluoroacetone (HTTA) as an extractant medium:

Table IV

| Sample | Organic Phase | Aqueous Phase | Optical System | Exp. | 91/90 Ratio | EF as $\left(\frac{91}{90}\right)$ | K |
|---|---|---|---|---|---|---|---|
| 27 | 0.5 M HTTA | 0.05 M $ZrOCL_2$ | a | b | f = 0.21850 | | |
| 28 | Benzene | 0.1 M $H_2C_2O_4$ | | | h = 0.21829 | 0.9978 | 0.67 |
| 29 | | 2 M HCl | | | t = 0.21877 | | |
| 30 | | | | c | h = 0.21835 | 0.9939 | 0.75 |
| 31 | | | | | t = 0.21970 | | |
| 32 | 0.5 M HTTA | 0.05 M $ZrOCl_2$ | a | c | f = 0.21853 | | |
| 33 | Xylene | 0.4 M $H_2C_2O_4$ | | | h = 0.21829 | 0.9983 | 0.35 |
| 34 | | 2 M HCl | | | t = 0.21866 | | |
| | 0.2 M HTTA | 0.05 M $ZrOCl_2$ | a | c | f = 0.21857 | | |
| 35 | Xylene | 0.2 M $H_2C_2O_4$ | | | h = 0.21838 | 0.9989 | 0.61 |
| 36 | | 4 M HCl | | | t = 0.21863 | | |
| | 0.2 M HTTA | 0.05 M $ZrOCl_2$ | a | c | f = 0l.21857 | | |
| 37 | Xylene | 0.2 M $H_2C_2O_4$ | | | h = 0.21846 | 0.9983 | 0.25 |
| 38 | | 6 M HCl | | | t = 0.21883 | | |
| | 0.2 M HTTA | 0.05 M $ZrCl_2$ | a | c | f = 0.21859 | | |
| 39 | Xylene | 0.2 M $H_2C_2O_4$ | | | h = 0.21838 | 0.9989 | 0.43 |
| 40 | | 4 M $HNO_3$ | | | t = 0.21863 | | |
| 41 | 0.5 M HTTA | 0.05 M $Zr(SO_4)_2$ | a | c | h = 0.21825 | 0.9982 | 0.25 |
| 42 | Benzene | 0.7 M $H_2SO_4$ | | | t = | | |
| 43 | | | | d | h = 0.21837 | 0.9977 | 1.00 |
| 44 | | | | | t = 0.21888 | | |
| 45 | | | | c | h = 0.21801 | 0.9940 | 1.50 |
| 46 | | | | | t = 0.21932 | | |
| | 0.2 M HTTA | 0.05 M $ZrOCl_2$ | SV | c | f = 0.21850 | | |
| 47 | Xylene | 0.2 M $H_2C_2O_4$ | | | h = 0.21799 | 0.9922 | 0.67 |
| 48 | | 4 M HCl | | | t = 0.21971 | | |
| 49 | | | | g | h = 0.21679 | 0.9839 | 0.69 |
| 50 | | | | | t = 0.22037 | | |
| | 0.2 M HTTA | 0.05 M $ZrOCl_2$ | SV | j | f = 0.21859 | | |

TABLE IV-continued

| Sample | Organic Phase | Aqueous Phase | Optical System | Exp. | 91/90 Ratio | EF as $\left(\frac{91}{90}\right)$ | K |
|---|---|---|---|---|---|---|---|
| 51 | Xylene | 0.2 M H$_2$C$_2$O$_4$ | | | h = 0.21848 | 0.9993 | 0.54 |
| 52 | Deoxygenated | 4 M HCl | | | t = 0.21863 | | |
| 53 | | 10-2 M Triton | L | | h = 0.21832 | 0.9943 | 0.67 |
| 54 | | | | | t = 0.21958 | | |
| 55 | | | | p | h = 0.21779 | 0.9895 | 0.67 |
| 56 | | | | | t = 0.22010 | | |
| 57 | | | | q | h = 0.21795 | 0.9901 | 0.67 |
| 58 | | | | | t = 0.22013 | | |
| | | 0.05 M ZrOCl$_2$ | | | | | |
| | | 0.05 M H$_2$C$_2$O$_4$ | | p | f = 0.21864 | | |
| 59 | | 4 M HCl | | | h = 0.21823 | 0.9917 | 2.70 |
| 60 | | 10-2 M Triton | | | t = 0.22005 | | |
| 61 | | | | q | h = 0.21805 | 0.9895 | 2.70 |
| 62 | | | | | t = 0.22037 | | |
| 63 | | 0.05 M ZrOCl$_2$ | | p | h = 0.21733 | 0.9882 | 5.67 |
| 64 | | 0.025 M H$_2$C$_2$O$_4$ | | | t = 0.21993 | | |
| | | 4M HCl | | | | | |
| 65 | | 10-2M Triton | | q | h = 0.21741 | 0.9873 | 4.56 |
| 66 | | | | | t = 0.22021 | | | a = 200 W Tungsten Filament Lamp
b = ½ hour
c = 2 hours
d = 2 min.
e = 5 min.
f = feed
g = 3.5 hours
h = heads
j = shake only
K = Distribution K = Org/Aqu
L = 1 hour
p = 3 hours
q = 6 hours
t = tails
Exp. = Exposure
EF = Enrichment Factor
SV = Sodium Vapor 300 mW 300-400 nM

EXAMPLE V

A series of runs were made using dibenzoylmethane as an extractant medium:

Table V

TABLE V

| Sample | Exposure | M(i) | Aqueous Weight Fraction | Organic Weight Fraction | α s(i) | Distribution K = Org/Aq | Photon Dose |
|---|---|---|---|---|---|---|---|
| | feed | 90 | 0.5059 | | | | |
| | | 91 | 0.1116 | | | | |
| | | 92 | 0.1729 | | | | |
| | | 94 | 0.1800 | | | | |
| | | 96 | 0.0295 | | | | |
| 67 | 3 min | 90 | 0.5055 | 0.5105 | 1.0203 | | |
| | | 91 | 0.1116 | 0.1117 | 1.0013 | | |
| | | 92 | 0.1731 | 0.1711 | 0.9858 | 0.10 | 0.33 |
| | | 94 | 0.1800 | 0.1802 | 1.0014 | | |
| | | 96 | 0.0298 | 0.0265 | 0.8861 | | |
| 68 | 5 min | 90 | 0.5056 | 0.5084 | 1.0113 | | |
| | | 91 | 0.1120 | 0.1099 | 0.9787 | | |
| | | 92 | 0.1728 | 0.1737 | 1.0066 | 0.20 | 0.50 |
| | | 94 | 0.1803 | 0.1789 | 0.9906 | | |
| | | 96 | 0.0296 | 0.0291 | 0.9816 | | |
| 69 | 10 min | 90 | 0.5063 | 0.5059 | 0.9982 | | |
| | | 91 | 0.1120 | 0.1115 | 0.9951 | | |
| | | 92 | 0.1727 | 0.1730 | 1.0019 | 3.76 | 1.0 |
| | | 94 | 0.1794 | 0.1802 | 1.0053 | | |
| | | 96 | 0.0296 | 0.0295 | 0.9957 | | |
| 70 | 60 min | 90 | 0.5072 | 0.5058 | 0.9945 | | |
| | | 91 | 0.1124 | 0.1115 | 0.9912 | | |
| | | 92 | 0.1721 | 0.1730 | 1.0064 | 9.00 | 6.0 |
| | | 94 | 0.1789 | 0.1801 | 1.0085 | | |
| | | 96 | 0.0294 | 0.0295 | 1.0040 | | |
| 71 | 3 min | 90 | 0.5062 | 0.5059 | 0.9989 | | |
| | | 91 | 0.1122 | 0.1115 | 0.9928 | | |
| | | 92 | 0.1727 | 0.1730 | 0.0019 | 4.56 | 0.33 |
| | | 94 | 0.1795 | 0.1801 | 1.0043 | | |
| | | 96 | 0.0296 | 0.0295 | 0.9959 | | |
| 72 | 5 min | 90 | 0.5062 | 0.5059 | 0.9989 | | |
| | | 91 | 0.1122 | 0.1115 | 0.9935 | | |

TABLE V-continued

|    |        | 92 | 0.1725 | 0.1730 | 1.0033 | 9.00 | 0.5 |
|----|--------|----|--------|--------|--------|------|-----|
|    |        | 94 | 0.1797 | 0.1808 | 1.0024 |      |     |
|    |        | 96 | 0.0296 | 0.0295 | 0.9963 |      |     |
| 73 | 10 min | 90 | 0.5063 | 0.5059 | 0.9984 |      |     |
|    |        | 91 | 0.1122 | 0.1115 | 0.9934 |      |     |
|    |        | 92 | 0.1725 | 0.1730 | 1.0033 | 9.00 | 1.0 |
|    |        | 94 | 0.1794 | 0.1801 | 1.0047 |      |     |
|    |        | 96 | 0.0296 | 0.0295 | 0.9962 |      |     |
| 74 | 60 min | 90 | 0.5068 | 0.5059 | 0.9963 |      |     |
|    |        | 91 | 0.1124 | 0.1115 | 0.9913 |      |     |
|    |        | 92 | 0.1725 | 0.1730 | 1.0033 | 9.00 | 6.0 |
|    |        | 94 | 0.1793 | 0.1801 | 1.0055 |      |     |
|    |        | 96 | 0.0294 | 0.0294 | 1.0041 |      |     |

Samples 67 and 71 have organic phases, aqueous phases and optical systems as follows:

| Sample | Organic Phase | Aqueous Phase | Optical System |
|--------|---------------|---------------|----------------|
| 67 | 0.05 M DBM Xylene | 0.025 M $ZrCl_4$ 2 M HCl Deoxygenated 0.01 M Triton | Ar ion laser 0.55 W at 363 nm |
| 71 | 0.05 M DBM Xylene Deoxygenated | 0.025 M $ZrCl_4$ 2 M HCl 0.01 M Triton | Ar ion laser 0.55 W at 363 nm 30 min Prestir before Photolysis |

EXAMPLE VI

A series of runs were made using Cyanex 272 and Primene JMT as extractant mediums as follows:

Table VI

TABLE VI

Figure 5:
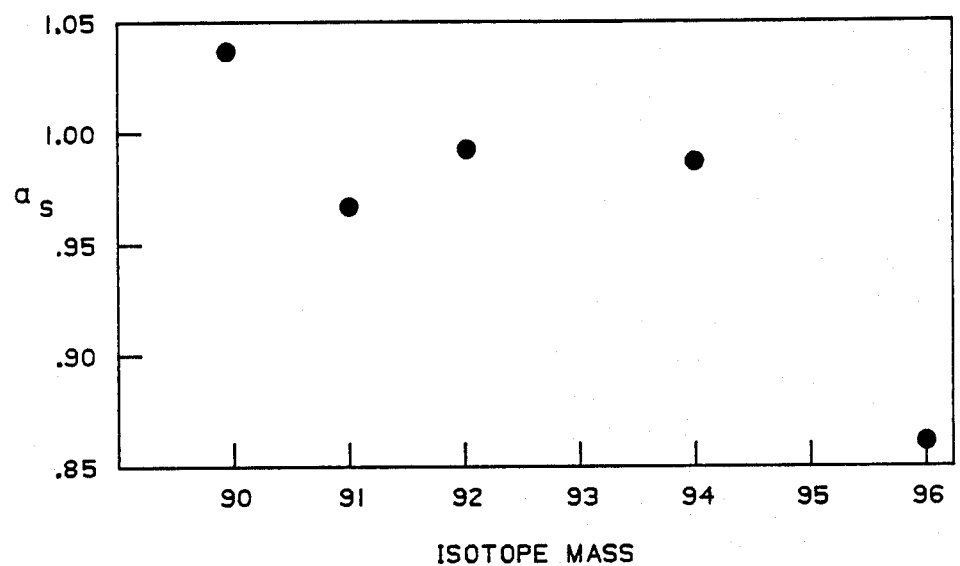
FIG. 5 illustrates the isotopic enrichment of a zirconium tetrachloride/4M $HCl/H_2C_2O_4$: thenoyltrifluoroacetone/xylene system following two hours of photolysis with a 200 W HPS lamp, with $\alpha_s$ for each isotope calculated from analysis of aqueous phase, assuming a distribution coefficient K=1.

| Sample | Organic Phase | Aqueous Phase | Optical System | Exp. | 91/90 Ratio | EF as $\left(\frac{91}{90}\right)$ | K |
|--------|---------------|---------------|----------------|------|-------------|------------------|------|
| 75 | 0.1 M Cyanex 272 | 0.05 M $ZrOCl_2$ | SV | q | h = 0.21838 | 0.9970 | 0.20 |
| 76 | Xylene Deoxygenated | 0.2 M $H_2C_2O_4$ 4 M HCl |    |   | t = 0.21903 |        |      |
| 77 | 0.1 M Primene JMT | 0.04 M $Zr(SO_4)_2$ | a | c | h = 0.21832 | 0.9968 | 0.61 |
| 78 | Kerosene 3% Tridecanol | 0.7 M $H_2SO_4$ |   |   | t = 0.21901 |        |      |
| 79 | 0.1 M Primene JMT | 0.05 M $ZrOCl_2$ | j | b | h = 0.21860 | 0.9995 | 0.43 |
| 80 | Kerosene | 0.1 M $H_2C_2O_4$ 0.7 M $H_2SO_4$ |   |   | t = 0.21871 |        |      |
|    |          |          | a | c | f = 0.21860 |        |      |
| 81 |          |          |   |   | h = 0.21821 | 0.9966 | 0.54 |
| 82 |          |          |   |   | t = 0.21896 |        |      | a = 200 W Tungsten Filament Lamp
b = ½ hour
c = 2 hours
f = feed
h = heads
j = shake only
K = Distribution K = Org/Aq
t = tails
EF = Enrichment Factor
Exp. = Exposure
SV = Sodium Vapor 300 mW 300–400 nm An early, key result of the runs of Examples 1–VI was the confirmation of the proposed photochemical mechanism, as illustrated by FIG. 5 of the drawings. The confirmation of the mechanism is based on the fact that the isotope with a non-zero nuclear moment, $^{91}Zr$, is clearly affected differently than the trend obeyed by the set of the other isotopes. The present photo-assisted solvent extraction process is indicated; the solvent extraction contribution produces a trend in $\alpha_s$ vs. isotope mass that slopes from 90 to 96. On top of the solvent extraction process is a photochemical effect that produces additional shift of $^{91}Zr$ from the aqueous to the organic phase. This result confirms the proposed mechanism involved in solvent extraction with photochemical assist.

EXAMPLE VII

Figure 6:
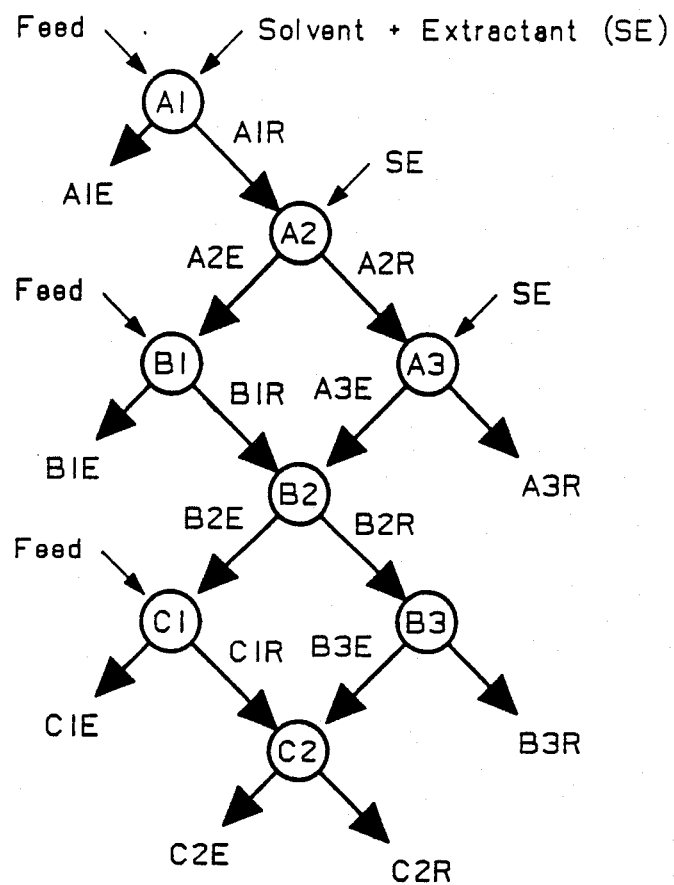
FIG. 6 is a process diagram for a 3-stage shakeout experiment. Aqueous feed loaded with zirconium is contacted with organic solvent and extractant at A1. The mixture is stirred and irradiated for a selected time, and then allowed to separate. The separated phases are propogated through the diagram as shown, with fresh organic introduced at A1, A2 and A3, and fresh aqueous at A1, B1 and C1.

A series of three stage runs were made using an aqueous solution of $Zr(SO_4)_2$, $H_2SO_4$ (to pH 3.63) and photochemical 0.0025M Triton, with an organic phase of xylene containing benzoylacetone. The runs used a three-stage photochemical shakeout, an experiment which requires eight contact operations as shown in the diagram in FIG. 6. These operations are required to create the properly loaded phases for the contacts which simulate the behavior in theoretical stages of a multi-stage column. Results of two such runs are shown in Table VII, for systems which differ only in the irradiation wavelength:

Table VII

TABLE VII

| Experiment | Sample | $^{90}Zr$ | $^{91}Zr$ | $^{92}Zr$ | $^{94}Zr$ | $^{96}Zr$ |
|---|---|---|---|---|---|---|
| | Zr-feed | 0.5051 | 0.1116 | 0.1735 | 0.1800 | 0.0298 |
| 83 | A3R | 0.5078 | 0.1116 | 0.1729 | 0.1798 | 0.0291 |
| | α | 1.02 | 1.00 | 0.992 | 0.997 | 0.953 |
| Argon ion | B3R | 0.5098 | 0.1100 | 0.1713 | 0.1790 | 0.0299 |
| laser | α | 1.034 | 0.968 | 0.970 | 0.987 | 1.007 |
| 363 nm | C2R | 0.5063 | 0.1113 | 0.1726 | 0.1799 | 0.0298 |
| 0.5 W | α | 1.01 | 0.994 | 0.987 | 0.999 | 1.00 |
| 84 | A3R | 0.5059 | 0.1112 | 0.1729 | 0.1801 | 0.0298 |
| | α | 1.006 | 0.992 | 0.992 | 1.004 | 1.000 |
| Argon ion | B3R | 0.5113 | 0.1098 | 0.1718 | 0.1774* | 0.0297 |
| laser | α | 1.051 | 0.964 | 0.977 | 0.965 | 0.993 |
| 458 nm | C2R | 0.5060 | 0.1116 | 0.1726 | 0.1800 | 0.0298 |
| | α | 1.015 | 1.000 | 0.990 | 0.999 | 0.976 |

These three-stage runs show two important results. One is that the big isotope shift comes after the second photolysis step, while the first photolysis seems to have been dominated by overall extraction with a small isotope shift. Secondly, the shift in the $^{90}Zr$ isotope is unexpectedly large, and may indicate a synergistic effect.

What is claimed is:

1. A process for reducing the amount of zirconium 91 isotope in zirconium comprising:

forming a first solution of (a) a first solvent, (b) a scavenger, and (c) a zirconium compound which is soluble in said first solvent and reacts with said scavenger when exposed to light of a wavelength of 220 to 600 nm;

irradiating said first solution with light at said wavelength for a time sufficient to photoreact a disproportionate amount of said zirconium compound containing said zirconium 91 isotope with said scavenger to form a reaction product in said first solution;

contacting said first solution, while effecting said irradiation, with a second solvent which is immiscible with said first solvent, which said second solvent is a preferential solvent for said reaction product relative to said first solvent, such that at least a portion of said reaction product is transferred to said second solvent to form a second solution; and separating said second solution from said first solution after said contacting.

2. The process as defined in claim 1 wherein said first solvent is acidic water.

3. The process as defined in claim 2 wherein said acidic water is a 0.5 to 8.0 molar solution of acid in water.

4. The process as defined in claim 3 wherein said acid is an inorganic acid selected from the group comprising hydrochloric acid, nitric acid and sulfuric acid.

5. The process as defined in claim 2 wherein said second solvent is a water-immiscible solvent selected from the group comprising benzene, toluene, xylene and kerosene.

6. The process as defined in claim 5 wherein said second solvent contains an extractant medium.

7. The process as defined in claim 2 wherein an excess of acid is provided in said acidic water sufficient to act as said scavenger.

8. The process defined in claim 2 wherein said zirconium compound is selected from the group comprising zirconium sulfate, zirconyl chloride, zirconium chlorate, zirconium tetrachloride and zirconium oxide.

9. A process for reducing the amount of zirconium 91 isotope in zirconium comprising:

forming a first solution of acidic water containing anions of an acid selected from the group consisting of hydrochloric acid, nitric acid and sulfuric acid; and a zirconium compound which is soluble in acidic water and reacts with said anions when exposed to light of a wavelength of 200 to 600 nm;

irradiating said first solution with light at said wavelength for a time sufficient to photoreact a disproportionate amount of said zirconium compound containing said zirconium 91 isotope with said anions to form a reaction product in said first solution;

contacting said first solution, while effecting said irradiation, with a second solvent which is immiscible with said first solvent for said reaction product relative to said fist solvent and contains an extractant medium, such that at least a portion of said reaction product is transferred to said second solvent to form a second solution; and separating said second solution from said first solution after said contacting.

10. The process as defined in claim 9 wherein said acidic water is a 0.5 to 8.0 molar solution of said acid.

11. The process as defined in claim 10 wherein said second solvent is a water-immiscible solvent selected from the group comprising benzene, toluene, xylene and kerosene.

12. The process defined in claim 11 wherein said zirconium compound is selected from the group comprising zirconium sulfate, zirconyl chloride, zirconium chloroate, zirconium tetrachloride and zirconium oxide.

* * * * *